G. A. BOYDEN.
BOND.
APPLICATION FILED JUNE 22, 1921.

1,411,838.

Patented Apr. 4, 1922.
2 SHEETS—SHEET 1.

INVENTOR.
George A. Boyden
BY
John W. Llarley.
ATTORNEY.

G. A. BOYDEN.
BOND.
APPLICATION FILED JUNE 22, 1921.

1,411,838.

Patented Apr. 4, 1922.

Inventor
George A. Boyden

By John W. Darley.
Attorney

UNITED STATES PATENT OFFICE.

GEORGE A. BOYDEN, OF BALTIMORE, MARYLAND, ASSIGNOR TO GEORGE A. BOYDEN, JR., OF BALTIMORE, MARYLAND.

BOND.

1,411,838.                    Specification of Letters Patent.     Patented Apr. 4, 1922.

Application filed June 22, 1921. Serial No. 479,473.

*To all whom it may concern:*

Be it known that I, GEORGE A. BOYDEN, a citizen of the United States, residing at Baltimore, in the State of Maryland, have invented certain new and useful Improvements in Bonds; and I do hereby declare the following to be a full, clear, and exact description of the invention, such as will enable others skilled in the art to which it appertains to make and use the same.

My invention relates to bonds.

Among the objects of my invention are:—

To provide a bond having an index and having nominated in the body thereof such conditions as are usual or that may be desired, and a plurality of classes of coupons for said bond which may be formed integrally with said body or separate therefrom, as desired. Each class is to comprise a plurality of coupons each of which specifies an amount to be paid and the date of payment. The several classes of coupons may be made payable upon the same or different dates. Some may be made payable for interest on money invested; others may be made payable for commission on the sale of the bond, or for services rendered. The coupons may be so arranged that the interest, commission, or other payments, may be made payable to different persons.

Figure 1:
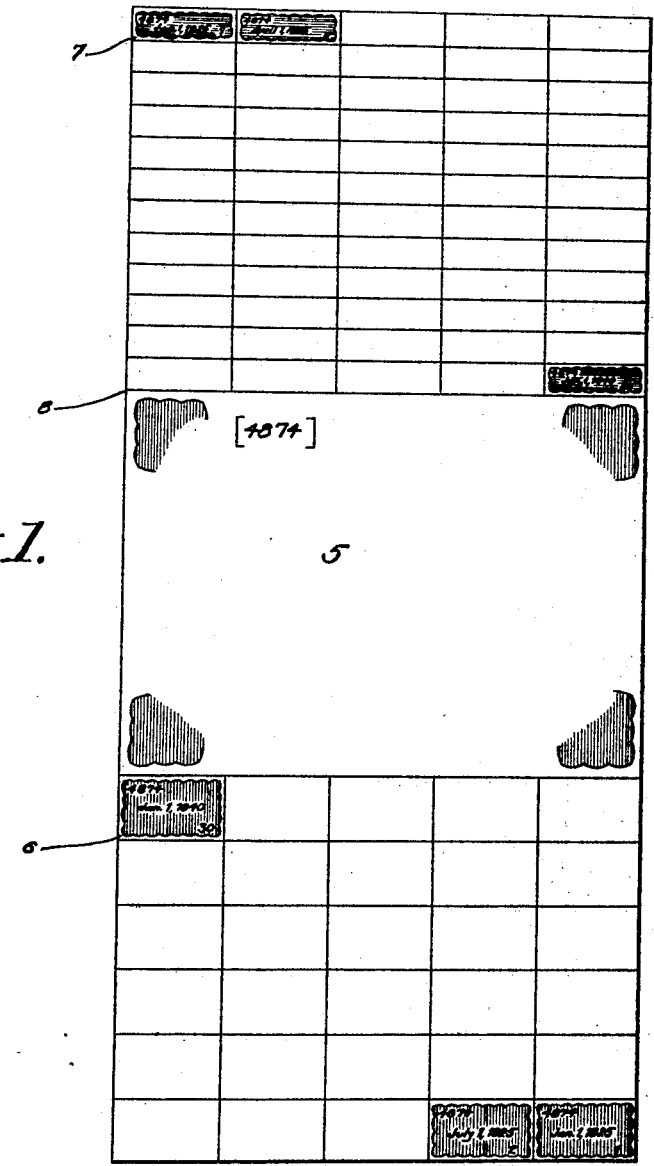
Fig. 1 shows one arrangement of my improved bond.
Figure 2:
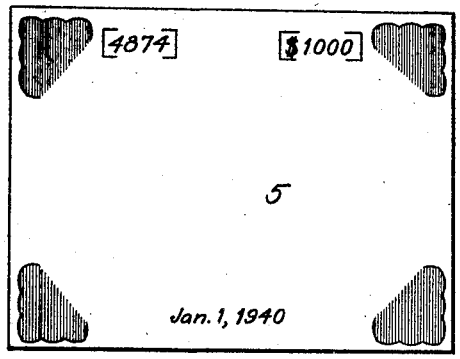
Figs. 2, 3 and 4 show, respectively, the body of the bond and one of each of the sets of coupons separated from each other.
Figure 3:
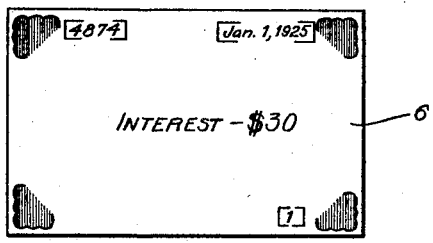
Figure 4:
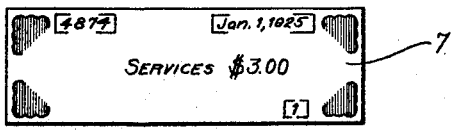

5 represents the body of the bond which may be numbered as 4874 and which has the usual or any desired printed matter thereupon, the name of the purchaser of the bond, and the covenants thereof.

The coupons 6 are numbered the same as the bond—4874—and in addition, they are numbered serially, beginning with 1 upon the coupon to be first detached and ending with the highest number, as for instance 30, upon the coupon to be last detached. Each coupon also bears printed thereupon its date of payment, as for instance, January 1, 1925, July 1, 1925 and so on at dates six months apart until January 1, 1940.

The coupons 7 are numbered the same as the bond—4874—and in addition, these coupons are also numbered serially, beginning with 1 upon the coupon that is to be first detached and ending, as for instance with 60, upon the coupon that is to be last detached. Each of the coupons 7 has also printed thereupon its date of payment, as for instance, January 1, 1925 for the first coupon, and January 1, 1940 for the last coupon, No. 60. The next coupon to be cut after coupon No. 1 may be No. 2 and printed in the same color as coupon No. 1 and dated, as for instance, April 1, 1925; that is, three months from the date of payment of coupon No. 1. Thus, the coupons from 1 to 60, if printed in the same color, would become payable at intervals of three months. Or the coupons No. 7 may be formed in two groups, each group containing thirty coupons, the groups being of diverse colors so that one group may be readily detached and kept by one payee and the other group detached and kept by another payee.

My improved bond is especially suitable for use in financial transactions where it is desirable to have a fiduciary to market the bonds and to have the payment of the commission to the fiduciary distributed over a term of years contemporaneous with the payment of interest to the owner of the bond.

It is to be noted that upon each of the coupons 6 is to be printed as usual the amount of the interest due on the corresponding date upon the face of the bond. Upon each of the coupons 7 is to be printed the amount of the commission or other payment for services due upon the corresponding date.

As indicated in the drawing, the body of the bond and the coupons 6 are printed in a reddish color and the coupons 7 are indicated as being printed in a bluish color. Other colors may be used in place of said colors and, if desired, the body of the bond and the coupons 6 and 7 may be printed in the same colors, or they may be printed in three different colors.

It is also to be noted that the coupons 7 are one-half the size of the coupons 6. They may, however, be of any relative size.

In carrying out a transaction involving the use of my improved bond, said bonds are issued by the mortgagor to the fiduciary who, upon selling the bond, delivers to the purchaser the body 5 and the coupons 6 after tearing the coupons 7 from the body 5 along the line 8. The purchaser will then cut the coupons 6 and either deposit or present same for payment as usual. The fiduciary company will then cut the coupons 7 upon the dates of their payment and collect the face value of said coupons.

It is to be noted that the coupons 7 are made payable at intervals of three months. They may be made payable at intervals of six months or a year as desired, and the number of the coupons such as 7 attached to the body 5 will be correspondingly varied. Or the coupons 7 instead of being numbered serially from 1 to 60 may be divided into two groups and the coupons in each group numbered serially from 1 to 30, so that said groups may be delivered to two fiduciaries if two fiduciaries take part in the selling of said bonds. In such a case, the colors of the two groups may be different.

I claim:—

A bond comprising a body having thereon indicia of its value, of its order in a series, and of its date of redemption; and two groups of coupons formed integrally with said body, each coupon of each group comprising indicia corresponding with the indicia of said order, and indicia of the date of payment of said coupon, each coupon in one group also comprising indicia of the value of said coupon as representing payments for interest upon the value of said bond; and each coupon in the other group also comprising indicia of the value of said coupon as representing periodical payments for indebtedness other than the value of the bond and of the interest thereon.

In testimony whereof, I affix my signature.

GEORGE A. BOYDEN.

Witness:
HORATIO F. BROWN.